(VERTICAL POLARIZATION 14)

ANGLE OF INCIDENCE
n=1.3369

(HORIZONTAL POLARIZATION 16)

ANGLE OF INCIDENCE
n=1.585

INVENTOR
THOMAS J. HARRIS
BY David N. Koffsky
ATTORNEY

United States Patent Office 3,353,894
Patented Nov. 21, 1967

3,353,894
ELECTRO-OPTIC LIGHT DEFLECTOR UTILIZING TOTAL INTERNAL REFLECTION
Thomas J. Harris, Poughkeepsie, N.Y., assignor to International Business Machines Corporation, New York, N.Y., a corporation of New York
Filed June 8, 1964, Ser. No. 373,499
9 Claims. (Cl. 350—150)

ABSTRACT OF THE DISCLOSURE

Multi-stage apparatus is provided for acting on a beam of plane polarized light to deflect it to any one of a plurality of output locations. The light deflection is accomplished using total internal reflection techniques. Each stage includes a polarization rotator for providing the beam in one of two mutually orthogonal planes, a birefringent crystal for transmitting a beam with one polarization through it and for internally reflecting a beam with the other polarization and a reflecting device positioned to accept the reflected beam to redirect it into a path parallel to the transmitted beam.

---

This invention relates to light deflection systems and more particularly to a light deflection system which incorporates electro-optic techniques.

The laser, which produces a beam of coherent collimated uniquely polarized monochromatic light has extended the scope of useful electromagnetic radiation into the optical range. Information handling techniques which utilize the light from laser sources have the potential of increasing, by several orders of magnitude, data handling rates over even the advanced nanosecond computer technologies. The need for useful systems which are able to modulate and deflect light beams to desired discrete positions is thus obvious. To make such systems technically desirable, the positioning of the laser light beam should be at extremely high speeds.

Light positioning and modulating devices are known in the prior art. Light positioning devices have included the use of mirrors, mechanically moving diaphragms and the change in the optical properties of a medium through which the light is passed. Such mechanical means and mirrors are unsatisfactory for high speed operation due to their relative bulkness and high mass. Crystalline, liquid and gaseous mediums have been used in a wide variety of light deflecting devices. Such devices have had, however, little application due to the physical size required for an adequate and useful displacement or modulation of the light beam from one extreme to another. Some disadvantages of present devices are that while able to deflect the total light beam, they need extremely high voltages for control, or at tolerable voltages, they work as spatial selectors and pass only a small amount of light. Also, they act as scan type deflectors, i.e., they do not discretely position the light beam to a selected spot, but scan many spots in a line.

An apparatus which is capable of overcoming some of the aforementioned prior art inadequacies is described in U.S. patent application, Serial No. 285,832 assigned to the same assignee as this application. Therein is described a light deflection system which makes use of the phenomenon of double refraction exhibited by certain materials. The path the light takes in such materials is determined by the vibration (polarization) direction of the light. Thus, by controlling the direction of polarization of the light beam by a first means and then allowing the selectively polarized light to pass through the double refractive material, a deflection of the beam can be obtained with a series of such stages allowing the precise positioning of the beam over a large number of discrete output positions. When large deflections are required however, the system becomes somewhat unwieldly due to the fact that the amount of deflection which is obtainable from a double refractive material is proportional to the length of the light path through the material.

Accordingly, it is an object of this invention to provide an improved light deflection system of compact size for discretely positioning a light beam.

It is another object of this invention to provide a simple and inexpensive light deflector for discretely positioning a light beam operative at extremely high speeds.

It is a further object of this invention to provide a light beam deflection system using electro-optic techniques to digitally index the position of the beam of light.

It is still another object of this invention to provide a light beam deflection system wherein large light deflections can be obtained without the requirement of cumbersome apparatus.

Yet another object of this invention is to provide a light deflector wherein the optical path length is independent of the deflection of the light beam.

In accordance with the above stated objects, a light deflector is provided wherein a linearly polarized, collimated, monochromatic light beam is first passed through an electro-optic means which alters the beam's vibration or polarization direction to one of two 90° displaced directions. The linearly polarized beam is then directed through a birefringent means which characteristically passes a beam polarized in one direction in a substantially unaltered state but completely internally reflects a beam with the other polarization direction. Additional means are provided to axially align the path of the reflected beam after it is acted upon by the birefringent means with the path of the passed beam. If more than one stage is needed, the succeeding electro-optic means and birefringent means are provided sufficiently large so as to accommodate all possible beams from a preceding stage.

In one embodiment, optical path length compensation is provided by inserting specially oriented, varying length birefringent means between light deflection stages. In this manner, every optical path in the system is made of equal optical length so that a single lens can be used to project any of the plurality of beams.

The foregoing and other objects, features and advantages of the invention will be apparent from the following more particular description of preferred embodiments of the invention, as illustrated in the accompanying drawings.

Figure 1:
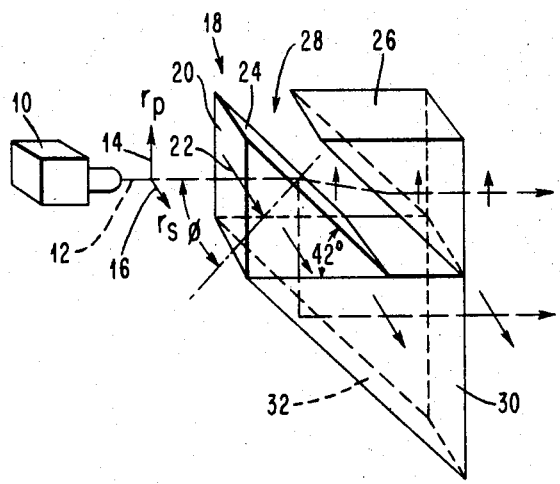
FIG. 1 is a view of the basic beam deflector.

Referring now to FIG. 1, there is shown a light deflector adapted to position a beam of linearly polarized light in one of two paths. A high intensity light source 10 produces a monochromatic, collimated vertically or horizontally plane polarized light output 12. Many combinations of means are available for producing such a light output, and one of which will be described in greater detail hereinafter, but for the moment, assume that light source 10 includes a laser in combination with means for linearly polarizing its light output in either the vertical direction as indicated by arrow 14 (in the plane of the paper) or the horizontal direction as indicated by arrow 16 (perpendicular to the plane of the paper). Disposed in the path of light beam 12 is a birefringent crystal 18 which may conveniently, for example, be sodium nitrate (NaNO₃). Crystal 18 is specially cut so that its surface 20 is parallel to the crystal's optic axis 22. Crystal 18 is also oriented in such a manner that light beam 12 enters face 20 at normal incidence. Thus, whether light beam 12 is vertically or horizontally polarized it enters surface 20 and experiences no refractive effects. The next surface in crystal 18 which light beam 12 intersects is surface 24 which is so oriented that the angle of incidence of light beam 12 invariably lies between the critical angles for the two distinct polarizations.

Figure 2:
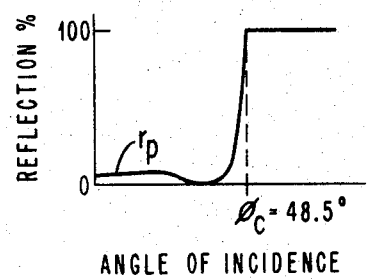
FIG. 2 is a plot of percent of reflection versus the angle of incidence for vertically polarized light in a sodium nitrate crystal.
Figure 3:
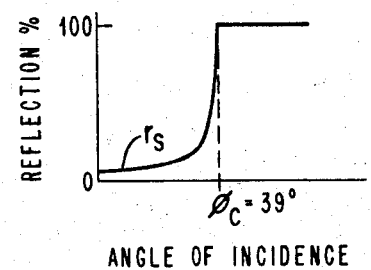
FIG. 3 is a plot of percent of reflection versus angle of incidence for horizontally polarized light in a crystal of sodium of nitrate.

This can better be understood by referring to FIGS. 2 and 3. Sodium nitrate is a uniaxial crystal with an oridinary refractive index at a wave length of 5890 angstroms of 1.585 and an extra-ordinary index of 1.3369. Thus, for the orientation shown, a horizontally polarized light beam sees an index of 1.585 and a vertically polarized beam sees an index of 1.3369. In FIG. 2, a plot of percent of reflections verses angle of incidence for vertically polarized beam 14 is shown. By definition, the critical angle for a boundary separating two optical media is the smallest angle of incidence in the medium of greater index for which the light is totally reflected. In this case, since the index of refraction for vertical polarized light in crystal 18 is 1.3369 and since the other medium at the boundary is air with an index of 1, the critical angle is dependent upon the index of refraction of crystal 18. The critical angle for such an index of refraction is determined by the following expression:

$$\text{Critical angle } \phi_o = \text{Sin } \phi_o = \frac{1}{n} = \frac{1}{1.3369} \quad (1)$$

$$\text{Sin } \phi_o = .749$$

$$\phi_o = 48.5°$$

It can thus be seen from an examination of the plot in FIG. 2 that if light beam 12 is vertically polarized and is incident upon surface 24 with an angle of incidence less than 48.5°, it will pass through surface 24 substantially unaffected in intensity. For an angle of incidence greater than 48.5°, such a beam is totally reflected by surface 24.

Referring now to FIG. 3, a plot of reflection versus angle of incidence for a horizontally polarized light beam 16 is shown. Using equation (1), it can be determined that critical angle for a sodium nitrate crystal in an evironment or horizontally polarized light is 39°. Thus, for an angle of incidence less than 39° substantially all horizontally polarized light is passed whereas for angle of incidence above 39° substantially all is deflected. To therefore construct a crystal which selectively passes or reflects a light beam dependent upon its polarization, the angle of incidence of the light beam on the crystal surface must be made to fall between the critical angles for the two distinct polarizations.

To construct such a crystal, face 24 of crystal 18 is oriented at 42° so that it completely reflects all horizontally polarized light 16 and substantially completely passes all vertically polarized light 14. While the vertically polarized light experiences a small loss in crystal 18 (2%) it can be neglected. It should be realized that the orientation of surface 24 need not be expressly 42° but may be any angle which falls between the two critical angles. Likewise, while sodium nitrate is a preferred crystal, other uniaxial crystals which exhibit similar characteristics may also be utilized, e.g., calcite.

With the light deflecting operation of crystal 18 now in mind, the remaining portions of the light deflector shown in FIG. 1 will be described. Correcting crystal 26 is separated from crystal 24 by air gap 28. The size of air gap 28 is greatly exaggerated for illustration purposes. The only reason for including correcting crystal 26 is to align vertically polarized light beam along the path originally taken by light beam 12. When a vertically polarized light beam leaves surface 24 and enters air gap 28, it experiences a small downward refraction. Crystal 26, which is an exact duplicate of crystal 18, provides a corrective refraction to the light beam and returns it to its original path. Crystal 26 need not be sodium nitrate but it must exhibit a refractive index of 1.3369 in order to provide the necessary path correction (sodium fluoride, for example). It is also possible that under some circumstances the slight refraction of light beam 12 can be tolerated.

As aforestated, a light beam polarized in a horizontal direction 16 is totally reflected by surface 24, with the angle of reflection equaling the angle of incidence. Since crystal 18 is a 42° prism, this means that the horizontally polarized light is directed downwardly. To return the deflected beam back to a path which is aligned with but physically displaced from the path of the vertically polarized light, crystal 30 is provided. This crystal may also be a 42° prism and may either be another sodium nitrate crystal or merely at 42° glass prism. In either case, complete reflection will take place when the light beam is incident upon surface 32, thereby returning the horizontally polarized light beam to its original direction of orientation.

In summary then, the light deflector shown in FIG. 1 will have substantially no effect upon a vertical linearly polarized light beam but, on the other hand, will deflect a horizontal linearly polarized light beam and cause an offset in its path of propagation.

Figure 4:
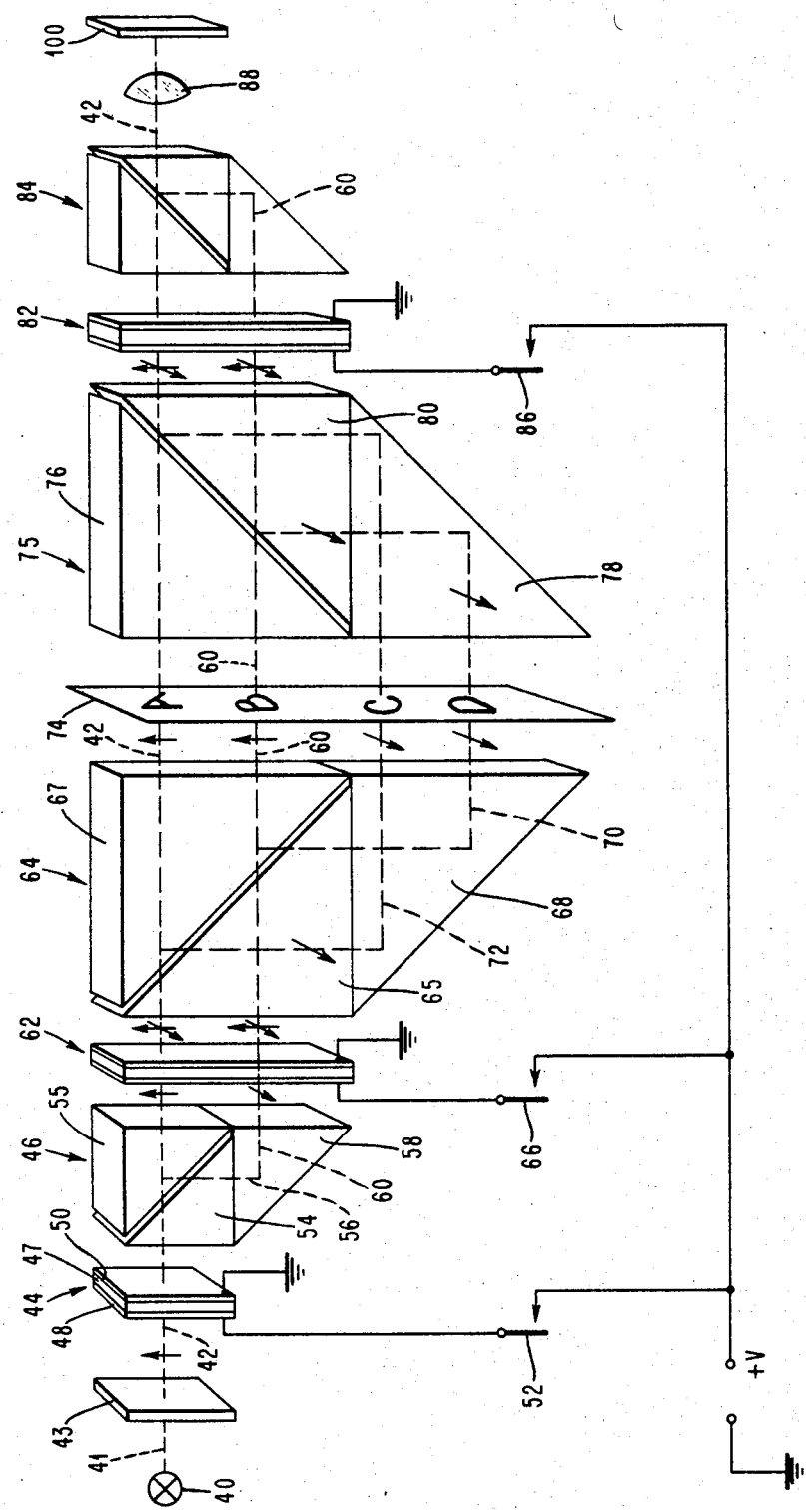
FIG. 4 is a view of a light deflector in accordance with this invention.

Referring now to FIG. 4, a light deflector utilizing the concept described with respect to FIG. 1 is shown. Light source 40 produces a collimated, monochromatic, plane polarized, light beam 41 and directs it along path 42. Source 40 may conveniently be a laser or alternatively, it may be a standard source of light using a pinhole-lens technique for obtaining the required beam. To convert light beam 41 to a linearly polarized beam with a vibration direction in the vertical, polarizing plate 43 is provided. After it is vertically polarized, light beam 41 is directed at the first stage of the light deflector which includes phase control means 44 and deflecting means 46. Phase control means 44 is electro-optic in nature and includes an electro-optic crystal 47 such as potassium dihydrogen phosphate. Other electro-optic crystals which are equally useful are described in the aforementioned copending application. Electro-optic crystal 47 is bounded on either side by a pair of transparent conductive electrodes 48 and 50. Transparent electrode 50 is connected to ground potential and transparent electrode 48 is connected via switch 52 to a source of high positive potential +V. If switch 52 is left open, phase control means 44 has no effect on a light beam, but if switch 52 is closed, thus applying the voltage +V between transparent terminals 48 and 50, an electric field is created in electro-optic material 47 which causes the vibration direction of a linearly polarized light beam to be rotated by 90°. If, for example, potassium dihydrogen phosphate is used as the electro-optic crystal 47, a voltage of approximately 7700 volts is required to cause the rotation effect.

After emerging from phase control means 44, beam 41 passes on to deflecting means 46. Deflecting means 46 is identical to that described with respect to FIG. 1 and includes a birefringent crystal 54, correcting crystal 55 and and reflecting crystal 58. Depending upon the polarization direction of light beam 41, it is either reflected or allowed to pass by deflecting means 46. If light beam 41 is vertically polarized, it continues on original path 42. On the other hand, if it is horizontally polarized it is reflected downwardly along path 56 at the crystal-air boundary in birefringent crystal 54. When the reflected horizontally polarized beam enters crystal 58, it is again reflected and is directed along path 60 which is parallel to the path of beam 42 but positionally displaced therefrom. It should be remembered that only one of these optical paths is activated at any one time.

Once means 41 exits from deflecting beam 46, it enters a second light deflection stage which includes phase control means 62 and deflector 64. Deflector 64 includes birefringent crystal 65 correcting crystal 67 and reflecting crystal 68. This stage is identical to the previous light deflection stage with the exception that its size is sufficiently large to accommodate either of the two beams which may emanate from the previous stage. High potential source +V is connected to the transparent electrodes of electro-optic phase control means 62 via switch 66. In the same manner as described for phase control means 44, the closure of switch 66 causes phase control means 62 to rotate the vibration direction of a linearly polarized beam passing therethrough by 90°. Thus, if a horizontally polarized beam is incident on phase control means 62 via path 60, its polarization direction will be rotated by 90° back to the vertical so that upon entering crystal 65 it will pass therethrough as a vertically polarized beam and remain on path 60. If, on the other hand, switch 66 remains open, the horizontally polarized beam will not be effected by phase control means 62 and will be internally reflected downwardly in crystal 65. When the horizontally polarized beam enters crystal 68, it will again be reflected, but this time onto path 70. In a like manner, a vertically polarized beam on path 42 would also have its vibration direction rotated by 90° to a horizontally polarized stage in phase control means 62 if switch 66 were closed. It would then be reflected downwardly by crystal 65 ultimately being reflected onto path 72 by crystal 68.

Thus far, the discussion has mainly concerned the means for deflecting a light beam to a number of discrete positions. By now referring to the remaining portions of FIG. 4, a projection system for projecting specific characters on screen 100 will be described which is just one of many useful manners of employing such a deflection system.

Mask 74 is interposed between deflectors 64 and 75. It may either be transparent with black letters or opaque with transparent letters. In either case, each of the letters or numbers are oriented so that they fall in one of the discrete light paths of the light deflector. Therefore, dependent upon which light path is energized, one of the letters will be illuminated. Assuming that the letters are transparent, and mask 74 opaque, an incident light beam will be shaped to the form of the letter as it continues along its incident path. If it is assumed that light path 70 is the one which is energized (horizontally polarized light), the letter D will be illuminated, and light will be transmitted therethrough. The light will continue along path 70 until it enters light deflector 75 wherein crystal 78 reflects the light beam upwardly into birefringent crystal 80. At the crystal-air boundary in crystal 80 the upwardly directed light beam is reflected along path 60 in a manner similar to that described for crystal 54.

The horizontally polarized beam on path 60 next sees phase control means 82 and deflector 84. In this case, switch 86 controls the application of +V to phase control means 82. Since it is desired to position the horizontally polarized light beam now on path 60 onto path 42 so that it may be projected on screen 100, there is no need to rotate its polarization since the light beam is again reflected in deflector 84 back to its original light path 42. The light beam on path 42 is then imaged by lens 88 onto translucent screen 100 where it may be viewed.

A further exemplary operation of the light beam deflector shown in FIG. 4 will now be described. Assume that it is desired to project the letter C onto screen 100. Further assume that the light emanating from source 40 is linearly polarized in the vertical direction. Thus, it is ultimately desired to direct light beam 41 now on path 42 down to path 72 and then back again to path 42 so that it can be seen on screen 100. To achieve this, switch 52 is left open while switches 66 and 86 are closed. Since switch 52 is open, vertically polarized light beam 41 passes through phase control means 44 and deflector 46 in an unaffected state. However, when light beam 41 arrives at phase control means 62, its direction of polarization is rotated by 90° due to the fact that switch 66 is closed. This results in light beam 41 being reflected downwardly by the internal reflective properties of birefringent crystal 65. When the light beam enters crystal 68, it is deflected along path 72 by crystal 68 so as to intersect the letter C in mask 74. Through the action of the horizontally polarized light beam passing through mask 74, the letter C is projected along path 72. When the light beam subsequentially enters crystal 78, it is reflected upwardly and, due to its horizontal polarization, is internally reflected back along path 42 by birefringent crystal 80. Since it is desired that the light beam be passed by deflector 84, its polarization direction is rotated by 90° to the vertical direction. This is accomplished in phase control means 82 due to the closure of switch 86. The light beam forming the letter C is therefore passed by deflector 84 and is imaged by lens 88 on screen 100. Since the operation of the system of FIG. 4 for the projection of letters A and B is principally the same as above described (the only differences being as regards the states of switches 52, 66 and 86), they will not be described in detail. Moreover, while the light deflectors have been shown as only deflecting light in the vertical direction, such deflectors can also be utilized to deflect light in a horizontal direction by merely rotating a light deflector 90° around its horizontal axis. Also, while only four vertical positions have been shown, subsequent deflection stages can be added to increase the number of possible outputs. In general, if there are n-stages, there are $2^n$ outputs.

Figure 5:
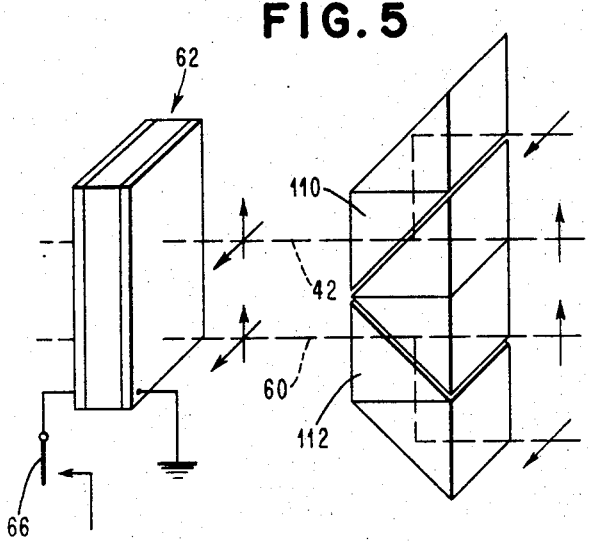
FIG. 5 is a modification of the light deflector of FIG. 4.

The size of crystals 65, 67 and 68 in deflector 64 can be reduced by a factor of two by using the arrangement shown in FIG. 5. Instead of deflecting all incoming beams in one direction, as is accomplished in deflector 64 of FIG. 4, the deflector of FIG. 5 deflects one set of beams upwardly and the other set downwardly. This is accomplished by mounting back-to-back, a pair of deflectors 110 and 112 of the same size as deflector 46 of FIG. 4. Deflectors 110 and 112 operate in an identical manner as described for deflector 46 of FIG. 1. Each respectively deflects a horizontally polarized light beam and passes a vertically polarized light beam. While this arrangement uses twice as many prisms as that of FIG. 4, the prisms are less expensive and easier to obtain due to their smaller size. Additionally, there is a limit to the size of the available prisms which put an undesirable limit on the ultimate dimensions of the final deflection stage. This configuration overcomes that problem.

In a light deflector such as shown in FIG. 4, a problem may arise in that the optical path lengths may differ between the various letters in mask 74 and lens 88. This may cause some of the letters (particularly those which are deflected several times) to be out of focus when projected on screen 100.

As is well known, the optical path length through any medium is the product of its index of refraction times the path length of a light beam through the medium. As aforestated the index of refraction is dependent on whether the plane polarized light propagates as ordinary or extraordinary rays. Thus, if the optic axis in a sodium nitrate crystal is oriented horizontally, a vertically plane polarized light beam propagates through the medium with an index of refraction of 1.3369. On the other hand, if the optic axis is oriented vertically, vertically plane polarized light propagates through the sodium nitrate with an index of refraction of 1.585. Since the index of refraction varies in accordance with the crystal orientation, the optical path length seen by the respective polarizations can be altered by causing the light beam to propagate through an additional preoriented crystal as an ordinary or extraordinary ray. This concept will be better understood by referring to FIGS. 6 and 7.

Figure 6:
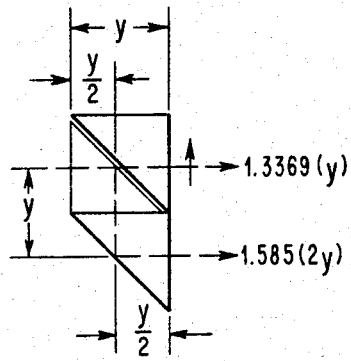
FIG. 6 is a view of a light deflector showing the differences in optical path length.
Figure 7:
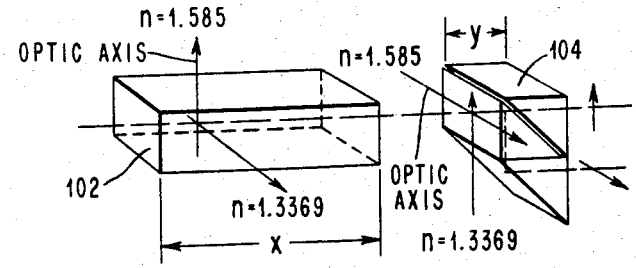
FIG. 7 is a view of a light deflector having optical path length compensation.

In FIG. 6 it can be seen that a sodium nitrate light deflector having a width $y$ will have an optical path length of 1.3369 ($y$) for vertically polarized light but will have an optical path length of 1.585 ($2y$) for horizontally polarized light. Since the ultimate desire is to cause both vibration directions of linearly polarized light to have the same optical path length, the vertically polarized light beam must be delayed by a factor $y$ to cause its optical path length to equal that of the horizontally polarized light beam. This is achieved in FIG. 7 by inserting an additional birefringent crystal 102 in the light path. Birefringent crystal 102 is oriented in such a manner that its optic axis is rotated by 90° relative to the orientation of the optic axis of deflector 104. Thus, vertically plane polarized light entering birefringent crystal 102 experiences an optical path length of 1.585 ($x$), whereas a horizontally plane polarized light beam will see an optical path length of 1.3369 ($x$). On the other hand, when the vertically polarized light propagates through deflector 104, it experiences an optical path length of 1.3369 ($y$) due to the difference in optic axis orientation. In a like manner, a horizontally plane polarized light beam propagating through deflector 104 sees an optical path length of 1.585 ($2y$). By setting the optical path lengths for the horizontally and vertically plane polarized light equal to each other, the length $x$ of crystal 102 can be determined in relation to the length $y$ of deflector 104. In this manner, the optical path lengths for both light polarizations can be made equal. For the particular example under consideration, that is, sodium nitrate, the equations are as follows:

$$2(1.585)y + 1.3369x = 1.3369y + 1.585x$$
$$0.25x = 1.83y$$
$$x = 7.32y$$

It can thus be seen that the length $x$ of crystal 102 must be 7.32 times the dimension $y$ in deflector 104 for equality of optical path lengths.

While the invention has been particularly shown and described with reference to preferred embodiments thereof, it will be understood by those skilled in the art that the foregoing and other changes in form and details may be made therein without departing from the spirit and scope of the invention.

I claim:
1. A light deflector for selectively deflecting a linearly polarized light beam to any one of a multiplicity of output locations, the combination comprising:
   a plurality of light deflection stages for deflecting the light beam to multiple locations equal in number to twice the number of stages,
   each stage including birefringent means in the path of the incoming beam for passing a light beam of one linear polarization direction and for internally reflecting a light beam of a second linear polarization direction, said second linear polarization direction being oriented at 90° with respect to said one linear polarization direction;
   reflection means disposed in the path of said reflected light beam for redirecting said beam in a path substantially parallel to the path of said passed light beam; and
   phase control means positioned in front of the birefringent means of each stage for having no effect on a light beam to provide the beam with the one polarization or rotating the direction of polarization of said light beam by 90° to provide the beam with the second polarization.
2. The invention as defined in claim 1 further including means for controlling each phase control means in accordance with information in the form of an applied electrical data signal.
3. In a light deflector, the combination comprising:
   means for selectively acting on a beam of plane polarized light to produce either of two linearly polarized light beams, the polarization direction of one beam differing by 90° from the polarization direction of the second beam;
   first birefringent means having a plurality of faces, one said face disposed normally with respect to the path of said linearly polarized light beams and oriented parallel to the optic axis of said first birefringent means and at least a second face oriented at an angle with respect to said linearly produced light beams, the angle of incidence of said light beams on said second face invariably falling below the critical angle for the polarization direction of the one beam so that said one beam passes through said second face with substantially undiminished intensity, said angle of incidence of said light beams on said second face invariably falling above the critical angle for the polarization direction of the second beam so that said second beam is completely reflected by said second face;
   second birefringent means spaced from said first birefringent means by an air gap and disposed in the path of said passed one beam, for realigning said one beam along its original direction by correcting any refraction imparted to it when said one beam exits into said air gap from said first birefringent means; and
   reflective means disposed in the path of the reflected second beam for reflecting said second beam in a path parallel to and in displaced relation to said one beam.
4. In the light deflector of claim 3, further comprising means disposed between the selectively acting means and the first birefringent means for compensating for path length differences between the one beam and the second beam.
5. In a light deflector for selectively deflecting a light beam generated by a source of collimated, monochromatic light, a plurality of light deflection stages, each stage comprising:
   controllable means for selectively causing said light beam to have one of two linear polarization directions, one polarization direction differing by 90° from the other polarization direction;
   first birefringent crystal means having a plurality of faces, one said face disposed normally with respect to the path of said light beams and oriented parallel to the optic axis of said birefringent means and at least a second face oriented at an angle with respect to said light beams, the angle of incidence of said light beams on said second face invariably falling below the critical angle for a beam having said one polarization direction so that said beam passes through said second face with substantially undiminished intensity, said angle of incidence of said light beam on said second face invariably falling above the critical angle for a beam having said other polarization direction so that a beam polarized in said other direction is completely reflected by said second face;
   beam aligning means displaced from the path of the incoming beam of light for accepting the reflected beam to redirect into a path substantially parallel to the path of the passed beam; and
   second birefringent means disposed between said controllable means and said first birefringent crystal means, the optic axis of said second birefringent means being orthogonally oriented with respect to the optic axis of said first birefringent crystal means, the optical path length through said second birefringent means acting to equalize the optical path lengths for both linear polarization direction beams through the combination of said second birefringent means, first birefringent crystal means and beam aligning means.

6. A light deflection system for interposition between a source of a beam of plane polarized light and a target to deflect the beam to a selected position in the target, comprising a plurality of optically aligned beam deflecting stages, each stage comprising in the order of the incoming beam of light, means for rotating the plane of polarization of the beam of light transmitted therethrough into one of two mutually orthogonal planes, birefringent means for transmitting therethrough a beam having a polarization in one plane and for internally reflecting a beam having a polarization in the orthogonal plane, and means displaced from the path of the incoming beam of light for accepting the reflected beam to redirect it into a path substantially parallel to and displaced from the path of the transmitted beam.

7. The system of claim 6, and further comprising means disposed between the polarization rotating means and birefringent means of each stage for compensating for path length differences between the orthogonally disposed beams.

8. A light deflection system for interposition between a source of a beam of plane polarized light and a target to deflect the beam to a selected position in the target, comprising a plurality of optically aligned beam deflecting stages, each stage comprising in the order of the incoming beam of light, means for rotating the plane of polarization of the beam of light transmitted therethrough into one of two mutually orthogonal planes, first birefringent means for transmitting therethrough a beam having a polarization in one plane and for internally reflecting a beam having a polarization in the plane orthogonal to it, second birefringent means for exerting a corrective refraction on the transmitted beam so that it is transmitted in a path to the target parallel to the path of the incoming beam of light, and means displaced from the path of the incoming beam of light for accepting the reflected beam to redirect it into a path parallel to and displaced from the path of the corrected transmitted beam.

9. Optical apparatus for interposition between a source of a beam of plane polarized light and a target for deflecting a light beam from the source to select a character from an information bearing medium and for projecting the selected character to the target, comprising first and second light deflecting systems respectively positioned in symmetrical manner about the medium, each of the light deflecting systems comprising a plurality of stages, each stage of the first system comprising in the order of the incoming beam of light, means for rotating the plane of polarization of the beam of light transmitted therethrough into one of two mutually orthogonal planes, birefringent means for transmitting therethrough a beam having a polarization in one plane and for internally reflecting a beam having a polarization in the orthogonal plane, and means displaced from the path of the incoming beam of light for accepting the reflected beam to redirect it into a path substantially parallel to and displaced from the path of the transmitted beam, each stage of the second system comprising in the order named, birefringent means and reflecting means positioned to accept all possible entering beams, the birefringent means being operative to transmit therethrough all beams incident on it and the reflecting means being operative to accept all beams incident on it for redirection to the birefringent means for combination with predetermined ones of the transmitted beams, and means for accepting the beam incident on it and provided by the birefringent means for rotating the plane of polarization into one of two mutually orthogonal planes.

References Cited

UNITED STATES PATENTS

| | | | |
|---|---|---|---|
| 2,745,316 | 5/1956 | Sziklai | 88—171 |
| 3,267,804 | 8/1966 | Dillon | 350—150 |

OTHER REFERENCES

Electronic, vol. 35, No. 45, pp. 30–32, Nov. 9, 1962.

Optical Processing of Information, edited by Pollack, Koester and Tippett, Sportan Books, Inc., 1963 Chapter 8, pp. 98–103, by Schmidt.

DAVID H. RUBIN, *Primary Examiner.*

JEWELL H. PEDERSEN, *Examiner.*

R. J. STERN, *Assistant Examiner.*